US000001918H

United States Statutory Invention Registration [19]

[11] Reg. Number: H1,918

Hoffpauir et al.

[45] Published: Nov. 7, 2000

[54] INTEGRATED AUTHENTICATION CENTER AND METHOD FOR AUTHENTICATION IN A WIRELESS TELECOMMUNICATIONS NETWORK

[75] Inventors: Scott D. Hoffpauir, Collierville; Steve B. Liao, Memphis, both of Tenn.

[73] Assignee: DSC/Celcore, Inc., Plano, Tex.

[21] Appl. No.: 09/026,283

[22] Filed: Feb. 19, 1998

Related U.S. Application Data

[60] Provisional application No. 60/060,107, Sep. 26, 1997.

[51] Int. Cl.[7] ..... H04M 1/00; H04Q 7/20

[52] U.S. Cl. ..... 379/242

[56] References Cited

U.S. PATENT DOCUMENTS

| | | | |
|---|---|---|---|
| 5,487,101 | 1/1996 | Fletcher | 379/60 |
| 5,521,961 | 5/1996 | Fletcher et al. | 379/59 |
| 5,623,532 | 4/1997 | Houde et al. | 379/58 |
| 5,627,881 | 5/1997 | Fletcher | 379/60 |

OTHER PUBLICATIONS

Steve Chen, "*Hybrid MicroSystems: The Ultimate Flexibility in Cellular Applications*", 1996, pp. 1–16, Celcore, Inc., Memphis, Tennessee.

"*GlobalHub Mobility Manager—"One Number" PCS Service Via Motorola PPS Residential Products*" pp. 1–2, Celcore, Inc., Memphis, Tennessee, 1996.

"*IS–41 Network Hub—The Mobility Manager for Celcore's GlobalSystem*" pp. 1–2, Celcore, Inc., Memphis, Tennessee, 1996.

"*GlobalHub*" pp. 1–10, Celcore, Inc., Memphis, Tennessee, 1996.

John Scourias, "*Overview of the Global System for Mobile Communications*", Mar. 27, 1996, pp. 1–16, John Scourias.

Martin A. Iroff & Steve Chen, "A distributed GSM Architecture for Low–Traffic Density Markets", *Mobile Communications International*, Oct. 1996, pp. 1–3, IBC Business Publishing, London, England.

Information pamphlet, Feb. 1997, pp. 1–7, Version 1.0, Celcore, Inc., Memphis, Tennessee.

"*BS–20/BS–21, D900/D1800 Base Transceiver Station*", pp. 1–2, Geschaftszweig Mobilfunknetze, Munchen, Germany, 1997.

"*Unique Solutions to Complex Challenges of Wireless Carriers*" pp. 1–9, Celcore, Inc., Memphis, Tennessee, 1997.

Michel Mouly and Marie–Bernadette Pautet "The GSM System for Mobile Communications", 1992, pp. 79–122, pp. 261–646, Cell & Sys, France.

George Lamb "*GSM made Simple*", 1997, pp. 3–158, Regal Printing, United States of America.

Lawrence Harte, Stever Prokup, and Richard Levine "*Cellular and PCS, The Big Picture*", 1997, pp. 61–181, McGraw–Hill, United States of America.

*Primary Examiner*—Daniel T. Pihulic
*Attorney, Agent, or Firm*—John G. Flaim

[57] ABSTRACT

In one aspect of the present invention, an integrated authentication center is provided that may be used in an exemplary integrated wireless telecommunications system (14). The integrated authentication center includes an application process, such as a call processing application (54), that includes a plurality of software objects such as a home location register (44) and an authentication center (42). The home location register (44) is implemented in one of the plurality of software objects of the application process and initiates the generation of an authentication set, such as authentication triplets. The authentication center (42) is also implemented in one of the plurality of software objects of the application process and generates the authentication set in response to the home location register (44).

37 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FIG. 4
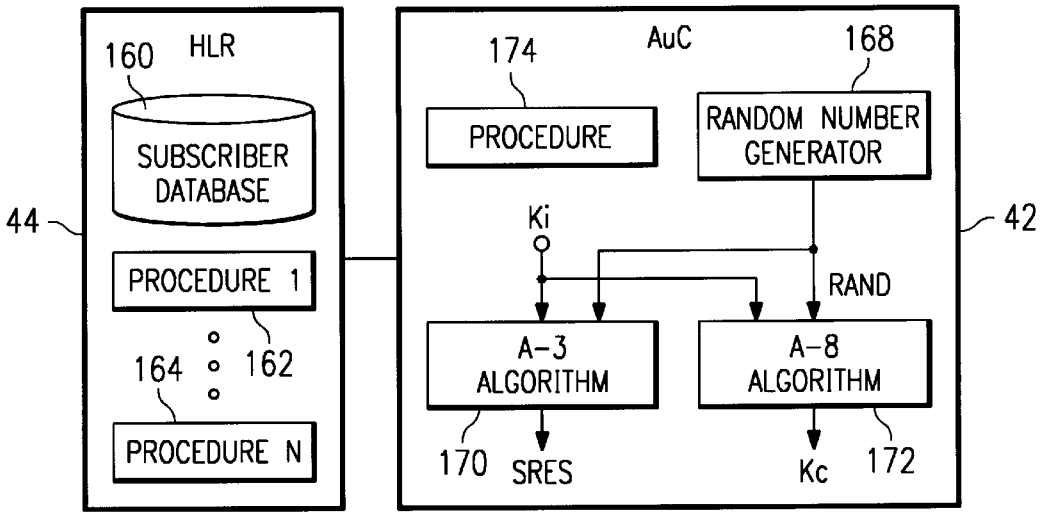
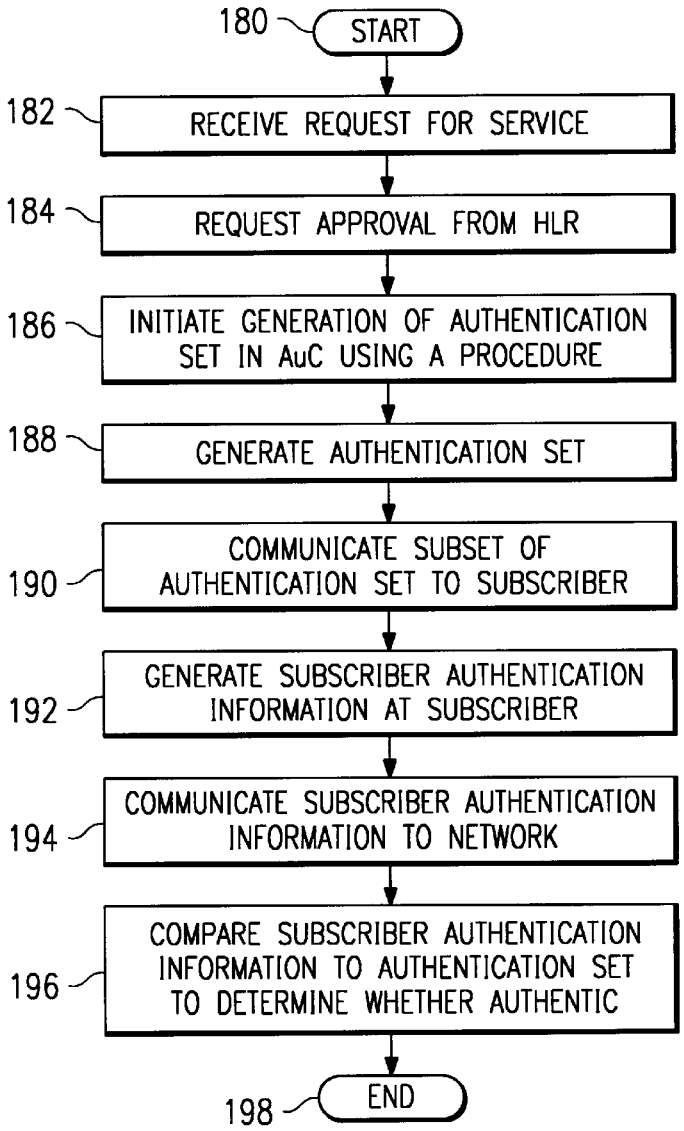
FIG. 5

INTEGRATED AUTHENTICATION CENTER AND METHOD FOR AUTHENTICATION IN A WIRELESS TELECOMMUNICATIONS NETWORK

CLAIM OF PRIORITY

This application claims priority from U.S. provisional patent application Ser. No. 60/060,107, entitled Cellular Communication System by Anthony G. Fletcher and Scott D. Hoffpauir as inventors, and filed on Sep. 26, 1997.

TECHNICAL FIELD OF THE INVENTION

This invention relates in general to the field of telecommunications and more particularly to an integrated authentication center and method for authentication in a wireless telecommunications network.

BACKGROUND OF THE INVENTION

Wireless telecommunications systems utilize any of a variety of technologies and standards such as, for example, Global System for Mobile Communications (GSM); Code Division Multiple Access (CDMA); Time Division Multiple Access (TDMA); Frequency Division Multiple Access (FDMA); Personal Communications Service (PCS); and Advanced Mobile Phone Service (AMPS). Wireless telecommunications systems, both digital and analog, are composed of several distinct pieces of equipment and processors that are interconnected, each to carry out dedicated functions. The costs and complexity associated with the manufacture, maintenance and interface of such distinct equipment are relatively high.

The difficulties associated with interfacing distinct equipment can be illustrated with a GSM wireless telecommunications system. GSM has become the standard digital cellular phone service throughout Europe, Japan, Australia and elsewhere and is defined in specifications provided by the European Telecommunications Standards Institute (ETSI). The GSM specifications define discrete functionalities that carry out dedicated functions. These discrete functionalities have been implemented using discrete equipment that must be interfaced.

GSM wireless telecommunications systems may be separated into various subsections such as, among others, a Network Subsystem (NSS), a Base Station Subsystem (BSS) and an Operations and Maintenance Center (OMC). These subsections include such components as (a) a Base Station Controller (BSC); (b) a Base Transceiver Station (BTS); (c) a Mobile Switching Center (MSC); (d) a Visitor Location Register (VLR); (e) a Home Location Register (HLR); (f) an Authentication Center (AuC); (g) an Operations and Maintenance Center-Radio (OMC-R); and (h) an Operations and Maintenance Center-Switching (OMC-S). The implementation of these components as discrete equipment and processors is cumbersome, complex and expensive.

For example, the functionality of the AuC and HLR are often implemented using separate equipment and processors. This significantly increases overall system costs and interface complexity. Maintenance and operational expenses are also increased because of the need to maintain separate equipment.

Although the integration of discrete functionalities may solve many of the complexities and expenses associated with the implementation of discrete, dedicated equipment and processors, additional problems are presented. One such problem surrounds processor capacity and loading.

For example, in a GSM wireless telecommunications system, a subscriber unit is generally authenticated each time the subscriber unit requests service. Authentication involves the generation of three values, referred to as "triplets," using the AuC. The triplets include a Random Number (RAND), a Signed Response (SRES) and a Ciphering Key (Kc). Authentication uses a previously stored and encrypted Authentication Key (Ki), that is unique for each subscriber, and the RAND as inputs to complex algorithms to generate both SRES and Kc. The complex algorithms are mathematically intensive and require extensive processor power and capability. As a result, authentication can be unacceptably lengthy, even when using dedicated equipment, such as a dedicated authentication center, to perform such functions. The situation becomes even more problematic as various wireless telecommunications system functionality is integrated into the same equipment that is controlled by the same processor. This further loads the processor and exacerbates the authentication problem outlined above.

SUMMARY OF THE INVENTION

From the foregoing it may be appreciated that a need has arisen for an integrated authentication center and method for authentication in a wireless telecommunications network that allows authentication to be performed in a timely manner without undue delay to a subscriber. The present invention allows for triplets to be calculated, on-demand, while providing all of the advantages of integration. This significantly reduces overall system costs and improves overall system performance. In accordance with the present invention, there is provided an integrated authentication center and method for authentication in a wireless telecommunications network that substantially eliminate and reduce the disadvantages and problems associated with authenticating a subscriber.

According to an aspect of the present invention, an integrated authentication center for use in a wireless telecommunications network is provided that includes an application process, a home location register and an authentication center. The application process includes a plurality of software objects and the home location register and the authentication center are implemented in one of the plurality of software objects of the application process. The authentication center generates an authentication set in response to the home location register.

According to another aspect of the present invention, a wireless telecommunications switch having an integrated authentication center is provided that includes a mobile switching center, a base station controller, an application process, a home location register and an authentication center. The application process includes a plurality of software objects and the mobile switching center, the base station controller, the home location register and the authentication center are implemented in one of the plurality of software objects of the application process. The authentication center generates an authentication set in response to the home location register.

According to yet another aspect of the present invention, a method for authentication in a wireless telecommunications network is provided that includes the steps of receiving a request from a subscriber for service and requesting approval from a home location register to provide service to the subscriber. The method further includes the steps of initiating the generation of an authentication set by an authentication center using a procedure, where the home location register and the authentication center are integrated in one or more software objects of an application process, and generating and communicating the authentication set to the subscriber.

The present invention provides a multitude of technical advantages. One technical advantage of the present invention includes the capability to integrate an authentication center and a home location register within an application process while performing authentication in a timely manner without any undue delay to a subscriber. This reduces overall system costs and increases overall system reliability because of the reduced hardware and equipment requirements. This also reduces maintenance costs because of the elimination of the need to maintain and update separate hardware and data. The integration of the authentication center and the home location register within an application process also provides the significant technical advantages of reduced software development costs and increased performance such that authentication sets do not have to be pregenerated. The use of the application process to integrate the authentication center and the home location register results in reduced software development requirements and reduces the amount of communication that is needed between the authentication center and the home location register which significantly reduces processor loading and the time required to generate authentication sets.

Another technical advantage of the present invention includes the elimination of the need to pregenerate authentication sets, such as triplets, for each subscriber. This reduces overall system costs by eliminating the need to provide larger storage devices, such as larger hard disk drives and larger random-access memory, to store the multiple authentication sets for each subscriber and reduces the overall potential for subscriber fraud by eliminating the existence of the stored pregenerated authentication sets. The elimination of the requirement to pregenerate triplets also reduces the load on the processor and allows the processor to perform other tasks more timely. Further, the elimination of the requirement to pregenerate triplets reduces the overall complexity of the software and thus, reduces overall costs.

Yet another technical advantage of the present invention includes, in one embodiment, the ability to store all subsciber data and authentication data in one database, such as an HLR database. This allows a new subscriber to be set up by storing subscriber information in one database using one step as opposed to multiple steps. This also reduces overall system complexity. Other technical advantages are readily apparent to one skilled in the art from the following figures, description, and claims.

BRIEF DESCRIPTION OF THE DRAWINGS

For a more complete understanding of the present invention and the advantages thereof, reference is now made to the following brief description, taken in connection with the accompanying drawings and detailed description of one embodiment of the present invention, wherein like reference numerals represent like parts, in which:

FIG. 4 is a block diagram illustrating an exemplary home location register software object and authentication center software object of an application process of the integrated wireless telecommunications system; and FIG. 5 is a flowchart illustrating an exemplary method for authentication using the authentication center software object of the application process of the integrated wireless telecommunications system.

DETAILED DESCRIPTION OF THE INVENTION

Figure 1:
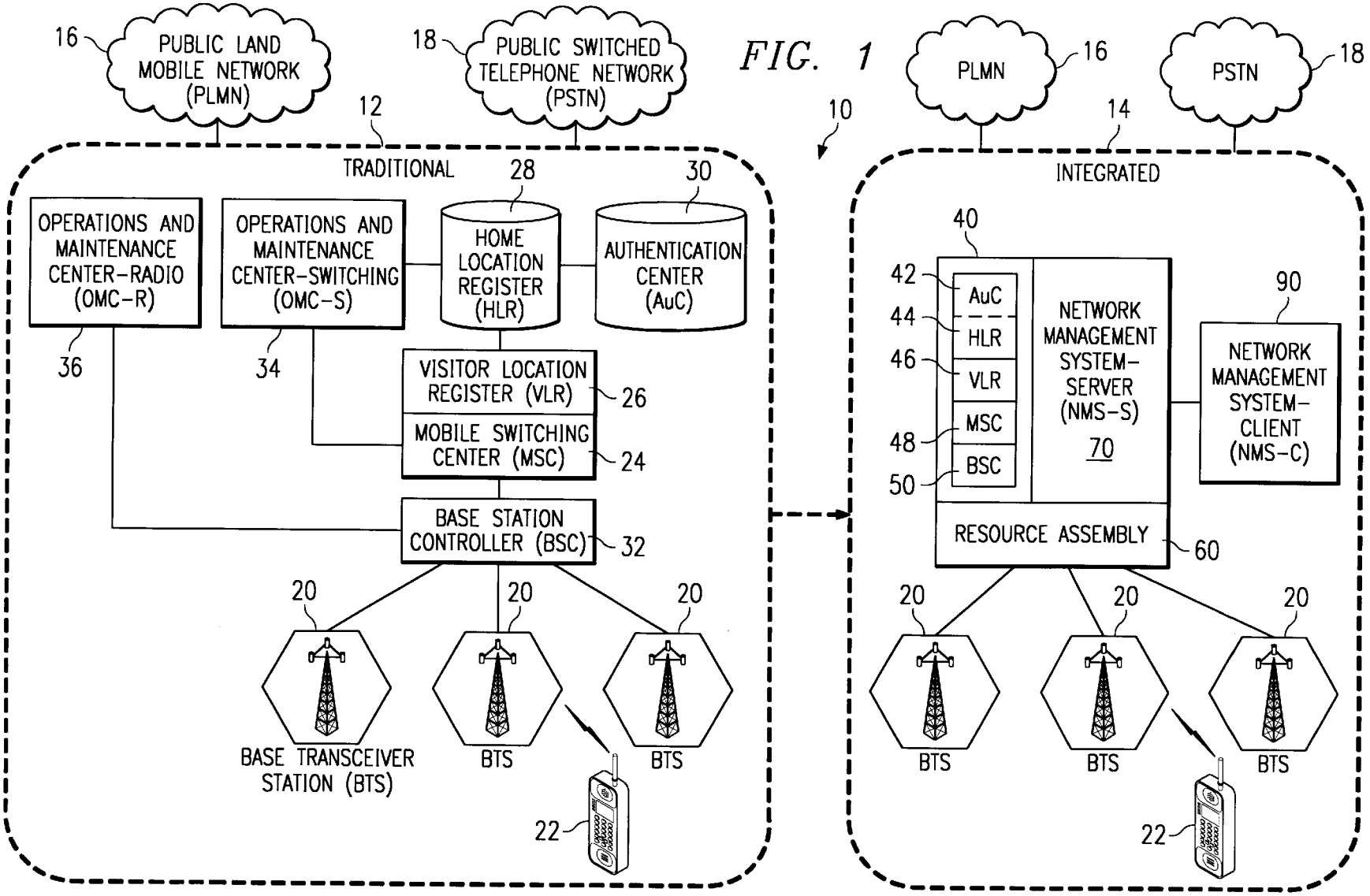
FIG. 1 is a block diagram illustrating the integration of a traditional wireless telecommunications system into an exemplary integrated wireless telecommunications system.

FIG. 1 is a block diagram 10 illustrating the integration of a traditional wireless telecommunications system 12 into an exemplary integrated wireless telecommunications system 14. The traditional wireless telecommunications system 12 and the integrated wireless telecommunications system 14 are illustrated as Global System for Mobile Communications (GSM) wireless telecommunications systems. However, it should be understood at the outset that the present invention, although illustrated herein using a GSM wireless telecommunications system, is in no way limited to GSM wireless telecommunications systems and may be implemented in a variety of wireless telecommunications systems using any of a variety of technologies and technical standards. For example, and without limitation, the present invention may be implemented in wireless telecommunications systems implementing the following technologies and technical standards: Code Division Multiple Access (CDMA); Time Division Multiple Access (TDMA); Frequency Division Multiple Access (FDMA); and Personal Communications Service (PCS).

The traditional wireless telecommunications system 12 and the integrated wireless telecommunications system 14 are shown coupled to a Public Land Mobile Network (PLMN) 16 and a Public Switched Telephone Network (PSTN) 18 for the exchange of information, including, for example, both voice and data. Of course, although PLMN 16 and PSTN 18 are public networks, the traditional wireless telecommunications system 12 and the integrated wireless telecommunications system 14 may also interface with private networks.

The traditional wireless telecommunications system 12 and the integrated wireless telecommunications system 14 preferably include one or more Base Transceiver Stations (BTS) 20 for communication through a common air interface or radio interface to a subscriber unit 22. The information exchanged through the common air interface or radio interface is provided as a digital signal in digital wireless telecommunications systems and as an analog signal in analog wireless telecommunications systems. This exchange of information may be encrypted to enhance privacy and security.

Each of the BTSs 20 generally include an antenna for exchanging radio signals with the subscriber unit 22 and a transceiver for exchanging information between the antenna and the wireless telecommunications switch, which is described more fully below. The BTSs 20 are normally housed in cabinets together with the antennas. The cabinets often contain an air-conditioning unit, heating unit, electrical supply, telephone hook-up and a back-up battery supply.

The remaining subsystems of the traditional wireless telecommunications system 12 and the integrated wireless telecommunications system 14 may be referred to as a wireless telecommunications switch. Many of the components or sub-systems of the traditional wireless telecommunications system 12 have been integrated to provide the novel solution illustrated by the integrated wireless telecommunications system 14. This integration may be best understood by first describing the various sub-systems of the traditional wireless telecommunications system 12 and then the integrated wireless telecommunications system 14.

The traditional wireless telecommunications system 12 includes, in addition to one or more of the BTSs 20 and subscriber units 22, a wireless telecommunications switch that may generally be defined to include the remaining components. For example, in a GSM wireless telecommunications system, these components may include a Base Station Controller (BSC) 32, a Mobile Switching Center (MSC) 24, a Visitor Location Register (VLR) 26, a Home Location Register (HLR) 28, an Authentication Center (AuC) 30, an Operations and Maintenance Center - Switching (OMC-S) 34, and an Operations and Maintenance Center - Radio (OMC-R) 36. With the exception of the MSC 24 and the VLR 26, each of these components or sub-systems of the wireless telecommunications switch is generally implemented as a separate piece of equipment, often from different manufacturers, that must be separately maintained and interfaced. As mentioned above, this is expensive, cumbersome and suffers from various disadvantages.

The BSC 32 is provided between the one or more BTSs 20 and the MSC 24 and provides control to the one or more BTSs 20. The BSC 32 is implemented as a stand-alone computer that manages the radio resources for the one or more BTSs 20 including radio-channel setup, frequency hopping and handovers. The BSC 32 tracks the various radio channels used by the one or more BTSs 20 and the subscribers that are using each radio channel. The BSC 32 allocates and releases the radio channels and regulates the transmit power level of the antennas of the one or more BTSs 20. As the subscriber unit 22 moves closer to an antenna, the BSC 32 lowers the transmitter power level, and as the subscriber unit 22 moves away from the antenna, the BSC 32 raises the transmitter power level.

In a GSM wireless telecommunications system, the BSC 32 can support and control multiple BTSs 20 through a proprietary link referred to as an Abis link. Information is generally exchanged between the one or more BTSs 20 and the BSC 32 at sixteen kbps. The LAPD protocol may be used for signaling. The proprietary Abis link normally requires the BSC 32 and the one or more BTSs 20 to be provided by the same manufacturer. This can substantially increase overall system costs. The BSC 32 may be implemented as a switch with significant computational capability. The BSC 32 may also include a Transcoder/Rate Adapter Unit (TRAU) that performs system dependent coding, such as GSM-specific speech encoding and decoding, and rate adaptation.

The BSC 32 also interfaces and exchanges information with the MSC 24 through a link defined in the GSM specifications and referred to as the "A" interface. Signaling information, normally using the Signaling System 7 (SS7) protocol, is exchanged between the BSC 32 and the MSC 24. Voice and data are also exchanged at sixty-four kbps. The BSC 32 may use the TRAU to convert the voice and data between sixteen kbps and sixty-four kbps.

The OMC-R 36 is a stand-alone sub-system that interfaces with the BSC 32. The OMC-R 36 manages and monitors the functions and operations of the BSC 32 and the one or more BTSs 20. The OMC-R 36 includes a user interface and is provided as a stand-alone workstation. Generally, the OMC-R 36 will be manufactured by the same company that manufactures the BSC 32 and the BTSs 20 that it manages and monitors. The OMC-S 34 is a separate stand-alone workstation that will be described more fully below.

The MSC 24 functions as a switch to connect calls from sender to receiver, to collect the details of calls made, and to supervise the operation of the remainder of the switch. As mentioned above, the MSC 24 is in contact with its mobile subscribers through the BSC 32. The MSC 24 interfaces with the BSC 32 through the A interface so that information, including signaling information, may be exchanged. The MSC 24, although not explicitly shown in FIG. 1, also interfaces with external networks such as the PLMN 16 and the PSTN 18 so that mobile subscribers, such as subscriber unit 22, can communicate with others outside of the traditional wireless telecommunications system 12. The MSC 24 can control or interface with multiple BSCs 32. In many switches, the MSC 24 and the VLR 26 are integrated in the same sub-system.

The combination of the MSC 24, the VLR 26, the HLR 28 and the AuC 30 function to provide mobility management to the wireless telecommunications switch. The VLR 26 provides a database containing information on all active subscriber units of the traditional wireless telecommunications system 12, including roaming subscriber units. An active subscriber unit is one that has requested access to the traditional wireless telecommunications system 12. The database of the VLR 26 provides a temporary subscriber record for each active subscriber unit being served by the MSC 24.

The VLR 26 is operated as part of the signaling network and receives information to generate this temporary subscriber record from the home HLR of each active subscriber unit. For example, the HLR 28 is the home HLR to the subscriber unit 22, whereas the home HLR of a roaming subscriber unit using the traditional wireless telecommunications system 12 would provide information to the VLR 26 through the signaling network provided, for example, through the PLMN 16 for the duration in which the subscriber unit 22 is in the service area of VLR 26. Information in the VLR 26 is generally retained for a set period of time, hence the reference to a temporary database, and includes such information as the subscriber's International Mobile Subscriber Identity Number (IMSI), information about the subscriber's services and features. The home HLR of a roaming subscriber unit is provided with the address of the traditional wireless telecommunications system 12 so that incoming calls to the roaming subscriber unit can be properly directed. The VLR 26 also works with the MSC 24 and other components to initiate and perform authentication functions to ensure that subscriber units attempting to access the traditional wireless telecommunications system 12 are authentic. The VLR 26 may also assists with recording the location of a local subscriber unit and communicates with the MSC 24 and other sub-systems using signaling information such as SS7 Mobile Application Part (MAP) messages.

The HLR 28 is the central depository for all information required to allow a customer to access and use the wireless telecommunications switch, such as a GSM switch. The information stored in the HLR 28 may be referred to as a subscriber database. The HLR 28 may not store information such as the customer's name or home address, that type of information is often stored in a billing or accounting system and could be stored in the OMC-S 34. The HLR 28 is an intelligent database used to store subscriber related information, such as features and services, and the location information needed to provide wireless telecommunications services. The subscriber information stored in HLR 28 is only for those subscribers that use the traditional wireless telecommunications system 12 as their home system. When these subscribers are roaming and using other wireless telecommunications systems, the HLR 28 provides pertinent information to the VLR of the visited system. The HLR 28 is operated as part of the signaling network. Information and data requests from/to the HLR 28 are provided using the signaling network, such as SS7 MAP messages.

The AuC 30 interfaces with HLR 28 and is used to authenticate a subscriber unit. Authentication is the process whereby a subscriber unit that requests access to a wireless telecommunications system, including roaming subscriber units, must prove it is not a fraud or counterfeit. The AuC 30 operates as part of the signaling network and stores information used in the authentication process for subscribers to the traditional wireless telecommunications system 12. A home AuC, not the AuC 30, is used in the authentication process by roaming subscriber units seeking access to the traditional wireless telecommunications system 12. This home AuC will generally be associated with the roaming subscriber units home wireless telecommunications system. The AuC 30 is defined by Interim Standard (IS-41) Rev. C as a stand-alone network element.

Authentication may be accomplished in a number of different ways, some more secure than others. GSM wireless telecommunications systems are generally considered very secure while many others are not. In some non-GSM systems, secret keys are exchanged between the system and the subscriber unit through the radio interface during authentication. These systems are generally considered less secure because of the increased possibility of intercepting and deciphering the secret keys.

In a GSM wireless telecommunications system, the AuC 30 includes complex mathematical algorithms used in the authentication process and a database to store an Authentication Key (Ki) corresponding to each of the subscriber units of the traditional wireless telecommunications system 12, but not including roaming subscriber units. The Ki may be encrypted. The home AuC of each of the roaming subscriber units stores a corresponding Ki, which also may be encrypted. The complex mathematical algorithms may include an A-3 algorithm and an A-8 algorithm as outlined by the GSM specifications and as determined by each wireless telecommunications system operator. Each of the subscriber units 22, including roaming subscriber units, include a memory, such as a Subscriber Identity Module (SIM) provided as either a "smartcard" or a module, that stores a corresponding Ki, A-3 algorithm and A-8 algorithm. Once again, the Ki may be encrypted.

The operation of the AuC 30 can best be illustrated after describing the authentication process. The following provides a general description of the authentication process in a GSM wireless telecommunications system. First, the subscriber unit 22 requests access to the traditional wireless telecommunications system 12 and sends its IMSI to the traditional wireless telecommunications system 12. Next, the MSC 24 asks the VLR 26 if it has a record for the subscriber unit 22. If no, the VLR 26 sets up a record by querying the home HLR of the subscriber unit 22 using the signaling network. This will preferably be performed using SS7 MAP messages. If the subscriber unit 22 is a roaming subscriber unit then its home HLR will be queried so that a record can be generated in the VLR 26, otherwise, the HLR 28 will be requested to provide information to the VLR 26.

Once a record for the subscriber unit 22 is established in the VLR 26, each time the subscriber unit 22 seeks to access the traditional wireless telecommunications system 12, the VLR 26 asks the home HLR to initiate the generation of authentication triplets in the home AuC for the subscriber unit 22. Assuming that the home HLR is the HLR 28, the VLR 26 asks the HLR 28 to provide authentication triplets for the subscriber unit 22. The HLR 28 then requests the authentication triplets from the AuC 30. The AuC 30 can then provide either previously generated and stored authentication triplets or it can generate them when requested. The AuC 30 generates the authentication triplets by generating a Random Number (RAND), decrypting the Ki, if it was previously encrypted, associated with the subscriber unit 22 and using RAND and the Ki as inputs to the A-3 algorithm and the A-8 algorithm. The A-3 algorithm at the AuC 30 generates a network generated Signed Response (SRES) as an output, and the A-8 algorithm at the AuC 30 generates a network generated Ciphering (Kc) as an output. The network generated Kc is used later to encrypt the information provided over the air or radio interface. The combination of the RAND, the network generated SRES, and the network generated Kc are referred to as the authentication triplets. Because these mathematical algorithms are very processor intensive, the generation of the network generated SRES and Kc may be time consuming. Thus, the AuC 30 may have to pregenerate and store several sets of authentication triplets for each of its subscribers so that these triplets are readily available when needed to authenticate one of its subscriber units. As can be seen, the storage and, hence, availability of pregenerated authentication triplets potentially reduces overall system security and increases overall system complexity. It should also be mentioned that the interface between the HLR 28 and the AuC 30 is often different from one vendor to another. This introduces compatibility issues and further increases overall system complexity.

The A-3 algorithm and the A-8 algorithm may be referred to as one-way or trap-door functions because Ki cannot be easily determined even if several pairs of RAND and outputs, such as SRES or Kc, are known. Thus, Ki is never sent through the signaling network and is only stored in the AuC 30 in an encrypted state. This, along with the fact that each system operator may implement different versions of the A-3 algorithm and the A-8 algorithm, drastically reduces the possibility of fraud in a GSM wireless telecommunications system. The GSM specifications have defined the size of RAND to be 128 bits long and the size of SRES to be 32 bits long.

Next, the authentication triplets, including the RAND, the network generated SRES, and the network generated Kc, are provided to the VLR 26 via SS7 MAP messages. The RAND is then provided to the SIM of subscriber unit 22. The SIM of subscriber unit 22 generates a corresponding subscriber generated SRES and a subscriber generated Kc using RAND and the locally provided Ki, A-3 algorithm and A-8 algorithm. The subscriber generated SRES is then provided back to the VLR 26 for comparison with the network generated SRES. If these values are the same, the subscriber unit 22 is authenticated, otherwise, it is not.

The AuC 30 also assists with encryption of the information exchanged between the subscriber unit 22 and the ETS 20 over the air or radio interface. As mentioned above, the network generated Kc, i.e., the Kc generated at the AuC 30, and the subscriber generated Kc, i.e., the Kc generated at the subscriber unit 22, are used later to encrypt the information provided over the air or radio interface. This increases privacy and security and eliminates eavesdropping.

The OMC-S 34 is another dedicated sub-system designed to manage and monitor the wireless telcommunications switch that includes the MSC 24, the VLR 26, the HLR 28 and the AuC 30. The dedicated OMC-S 34 and the dedicated OMC-R 36 are identified in the GSM specifications. The OMC-S 34 receives event alarms and system status/operational information that is critical to the operation of the traditional wireless telecommunications system 12. These alarms and system status/operational information may be logged for future analysis if needed. The OMC-S 34 may also be used to control, start and shut down certain equipment. Just as with the OMC-R 36, the OMC-S 34 will also generally be manufactured by the same company that manufactures the wireless telecommunications switch that it manages and monitors. In addition to its network operations and maintenance functions, the OMC-S 34 may also interface with a subscription management system.

The subscription management system may access and modify subscriber information stored in the subscriber database of the HLR 28. For example, the subscription management system may be used to update the subscriber information stored in the HLR 28, to add new subscribers including a Ki in the database of the AuC 30, to modify an existing subscriber's profile and to change the services and features available to the subscriber. The subscription management system may also receive and store operational statistics related to call processing that may then be used for accounting and billing.

Referring now to the exemplary integrated wireless telecommunications system 14, many of the components or sub-systems of the traditional wireless telecommunications system 12 have been integrated to provide the novel solution illustrated by the integrated wireless telecommunications system 14. Generally, the functionality of the BSC 32, the MSC 24, the VLR 26, the HLR 28 and the AuC 30 of the traditional wireless telecommunications system 12 has been integrated in the integrated wireless telecommunications system 14 as a call processor 40 and a resource assembly 60. The call processor 40 provides the overall switching and subscriber control to the integrated wireless telecommunications system 14 using signaling information and subscriber information. Similarly, the functionality of the OMC-S 34 and the OMC-R 36 has been generally integrated into a Network Management System-Server (NMS-S) 70 and a Network Management System-Client (NMS-C) 90. In one embodiment, the call processor 40, the resource assembly 60, the NMS-S 70, and the NMS-C 90 communicate through a Local Area Network (LAN) such as an Ethernet LAN. The integrated wireless telecommunications system 14 is described more fully below and in connection with FIG. 2 where a more detailed implementation of the exemplary integrated wireless telecommunications system 14 is presented.

The resource assembly 60 provides the physical connections with the one or more BTSs 20, the PLMN 16 and the PSTN 18 so that voice, data and signaling information may be exchanged. The resource assembly 60 may include any number of redundant circuit modules and controllers such as an interface module, a switching module, a telephony support module and a signal processing module. The interconnections with the one or more BTSs 20, the PLMN 16 and the PSTN 18 may be provided through the interface module, such as a quad span module, so that information may be exchanged through a telecommunications link or span such as, for example, an E-1 or T-1. The switching module may include a switching matrix to connect calls from sender to receiver and bus arbitration circuitry to arbitrate a control bus and a high speed bus, such as a Pulse Code Modulation (PCM) bus, of the resource assembly 60. The high speed bus can carry both voice and data.

The telephony support module of the resource assembly 60 may generate all needed tones such as trunk tones for trunk signaling and busy tones that may be provided on the high speed bus as needed. The telephony support module may also generate or store pre-recorded messages for playback as needed. Finally, the signal processing module may include one or more digital signal processors (DSPs) and associated software to perform echo cancellation when needed and to serve as a TRAU as described previously with respect to the BSC 32. Each of those modules of the resource assembly 60 preferably include software. Although the functionality of the resource assembly 60 has been described with respect to various modules, it should be understood that the functionality could be achieved using virtually any combination of software and hardware, with our without modules.

The call processor 40 uses signaling information and subscriber information to provide the overall switching control and subscriber control to the functionality provided by the resource assembly 60. In an exemplary embodiment, the call processor 40 may be implemented using a dedicated computer, such as a personal computer motherboard using an Intel Pentium microprocessor, and various software processes or applications that include software objects. The call processor 40 may also operate under the control of an operating system capable of processing real-time data such as, for example, the QNX operating system, the MICROSOFT WINDOWS NT operating system, or the like. The call processor 40, which is illustrated in more detail in FIG. 2, includes an application process that comprises an Authentication Center Object (AuC) 42, a Home Location Register Object (HLR) 44, a Visitor Location Register Object (VLR) 46, a Mobile Switching Center Object (MSC) 48, and a Base Station Controller Object (BSC) 50. The dashed line between the HLR 44 and the AuC 42 is provided to signify that the HLR 44 and the AuC 42, although preferably integrated as one software object with the AuC 42 embedded within the HLR 44, may also be implemented as separate software objects that are integrated into the same application process or executable file. The AuC 42 and the HLR 44 may serve multiple telecommunications switches in addition to the one provided in the integrated wireless telecommunications system 14. These software objects provide related control functionality to the dedicated, and often separate, systems previously described for the traditional wireless telecommunications system 12.

Each of the software objects of the call processor 40 will generally contain procedures, sometimes referred to as methods in object-oriented programming terminology, and data, sometimes referred to as variables or data elements. The software objects communicate with one another using a message. A message is provided from a sender software object to a receiver software object and includes the name of the receiver software object and the name of the procedure or method to be executed by the receiver software object. The message may also include a parameter for use by a procedure.

The call processor 40 may communicate with the resource assembly 60 and the NMS-S 70 through the Ethernet LAN. In an exemplary embodiment, the call processor 40 communicates with the NMS-S 70 using an Object Request Broker (ORB) such as the Common Object Request Broker Architecture (CORBA) developed by the Object Management Group (OMG). This provides standard object-oriented interfaces between external applications and platforms to provide interoperability of object-oriented software systems residing on disparate platforms. In an exemplary embodiment, the call processor 40 communicates with the resource assembly 60 using Sockets so that Transmission Control Protocol / Internet Protocol (TCP/IP), or the like, can be used for exchanging information.

The AuC 42, which preferably is implemented in the same software object as the HLR 44 but may be implemented in a software object separate from the HLR 44, includes a procedure to generate an authentication set or authentication triplets in response to the subscriber unit 22 requesting access to the integrated wireless telecommunications system 14. This request is generally received at the HLR 44 from the VLR 46 which in turn requests the AuC 42 to generate the authentication set for this subscriber unit 22. The request may come in the form of a message that requests the execution of a procedure in the AuC 42 and a parameter that includes the Ki of the subscriber unit 22 being authenticated. The AuC 42 preferably includes an A-3 algorithm and an A-8 algorithm. The A-3 algorithm and the A-8 algorithm may be provided as one or more procedures of the AuC 42. Further, the A-3 algorithm and the A-8 algorithm may be implemented as separate algorithms or as a combined algorithm. Still further, multiple versions of the A-3 and A-8 algorithms may be provided such that the HLR 44 also sends over the appropriate algorithm version for the subscriber so that authentication can be properly performed.

In other embodiments, the AuC 42 also includes a database of Kis for each subscriber unit that uses the integrated wireless telecommunications system 14. The database of Kis may or may not be encrypted. In such a case, the AuC 42 does not need to have a Ki provided by the HLR 44 because the AuC 42 can retrieve a corresponding Ki based on the IMSI provided by the HLR 44. It should also be noted that multiple versions of both the A-3 algorithm and the A-8 algorithm may be provided at the AuC 42. In such a case, information must be provided or retained that indicates which version of each algorithm is used by each subscriber.

In one embodiment, the AuC 42 generates a RAND and uses the RAND along with the subscriber's Ki as inputs to the A-3 algorithm to generate a network generated SRES and as inputs to the A-8 algorithm to generate a network generated Kc. The RAND, the network generated SRES and the network generated Kc are then provided to the requesting VLR, the VLR 46 in this case, so that the RAND can be sent to the subscriber unit 22 to complete the authentication. The subscriber unit 22 then generates a corresponding subscriber authentication set or triplets including a subscriber generated SRES. Any portion of the subscriber authentication set or triplets, such as the subscriber generated SRES and the subscriber generated Kc, may be referred to as subscriber authentication information. If the subscriber unit 22 is able to successfully generate and transmit back a subscriber generated SRES corresponding to the network generated SRES, the subscriber unit 22 will be authenticated by the VLR 46. The communication between the VLR 46, the HLR 44 and the AuC 42 will generally be provided via SS7 MAP messages.

The HLR 44 and the VLR 46 perform the same general functions previously described for the HLR 28 and the VLR 26. The HLR 44 and the VLR 46 include databases with subscriber information. The MSC 48 and the BSC 50 also perform the same general functions previously described for the MSC 24 and the BSC 32 with a few noted exceptions. The MSC 48 controls the switching of calls, collects the details of calls made, and supervises the operation of the remainder of the switch. The MSC 48 is in contact with its mobile subscribers through the BSC 50 and the resource assembly 60. The interface between the MSC 48 and the BSC 50 can still be maintained as an type A interface as defined by the GSM specifications. The MSC 48 controls a switching matrix of the resource assembly 60, such as the switching matrix of a switching module. It should also be mentioned that, just as with the VLR 26 and the MSC 24, the VLR 46 and the MSC 48 may be integrated. Thus, the VLR 46 and the MSC 48 may be implemented in the same software object but preferably are implemented as separate software objects.

The BSC 50 is implemented as a software object to manage the radio resources for the one or more BTSs 20, including radio-channel setup, frequency hopping and handovers, through the resource assembly 60. The BSC 50 preferably does not include a TRAU like the BSC 32. As mentioned above, the TRAU may be provided in the resource assembly 60.

The NMS-S 70 and the NMS-C 90 communicate with one another through the Ethernet LAN using CORBA, which is platform independent. The NMS-C 90, in one embodiment, may be implemented using a personal computer provided local or remotely to the NMS-S 70 and operating under the control of an operating system such as, for example, MICROSOFT WINDOWS 95, MICROSOFT WINDOWS NT CLIENT, and the like. If the NMS-C 90 is provided remotely, a modem, not shown in FIG. 1, will generally be provided to enable communication with the NMS-S 70. The NMS-C 70, in one embodiment, may be implemented using a dedicated computer, such as a personal computer motherboard using an Intel Pentium microprocessor, similar to the call processor 40. The NMS-S 70 preferably operates under the control of an operating system such as MICROSOFT WINDOWS NT SERVER and the like.

The NMS-S 70 and the NMS-C 90 include software processes or applications that include software objects used to perform the operations and maintenance previously performed by dedicated and distinct systems such as the OMC-S 34 and the OMC-R 36. This includes such functions as managing and monitoring the operations of the BSC 50 and the one or more BTSs 20, the MSC 48, the VLR 46, the HLR 44 and the AuC 42. The NMS-S 70 may receive and log event alarms and system status/performance information. This information may be viewed, as desired, by the NMS-C 90. The NMS-S 70 and the NMS-C 90 may also provide subscription management so that subscriber information may be accessed and modified as desired. This, of course, does not include a subscriber's decrypted Ki which should remain confidential, even from operations personnel. Subscription management may also allow subscription information provided in the HLR 44 and the AuC 42 to be updated. Further, the subscription management of the NMS-S 70 and the NMS-C 90 may also provide call processing information that may then be used for the accounting and billing functions needed for the integrated wireless telecommunications system 14.

In an exemplary embodiment, the NMS-S 70 may be enabled with web server software such as NETSCAPE COMMUNICATOR, MICROSOFT WINDOWS NT, and the like while the NMS-C 90 may be enabled with web browser software such as NETSCAPE NAVIGATOR, MICROSOFT EXPLORER, and the like. In such a case, the NMS-90 can access the NMS-70 through the Internet or through an intranet using a familiar graphical user interface. This provides significant flexibility when monitoring and operating the integrated wireless telecommunications system 14 and decreases the training time needed to train operations personnel. The NMS-S 70 and the NMS-C 90 also provide the significant advantage of allowing all data entry to be performed at one location, i.e., the NMS-C 90. This is in contrast to other systems where data must be entered, sometimes the same data, in multiple systems. In addition to the additional labor and time needed to enter data, the opportunity is present for the same data to be entered differently in different systems. In such a case, unpredictable results occur.

Figure 2:
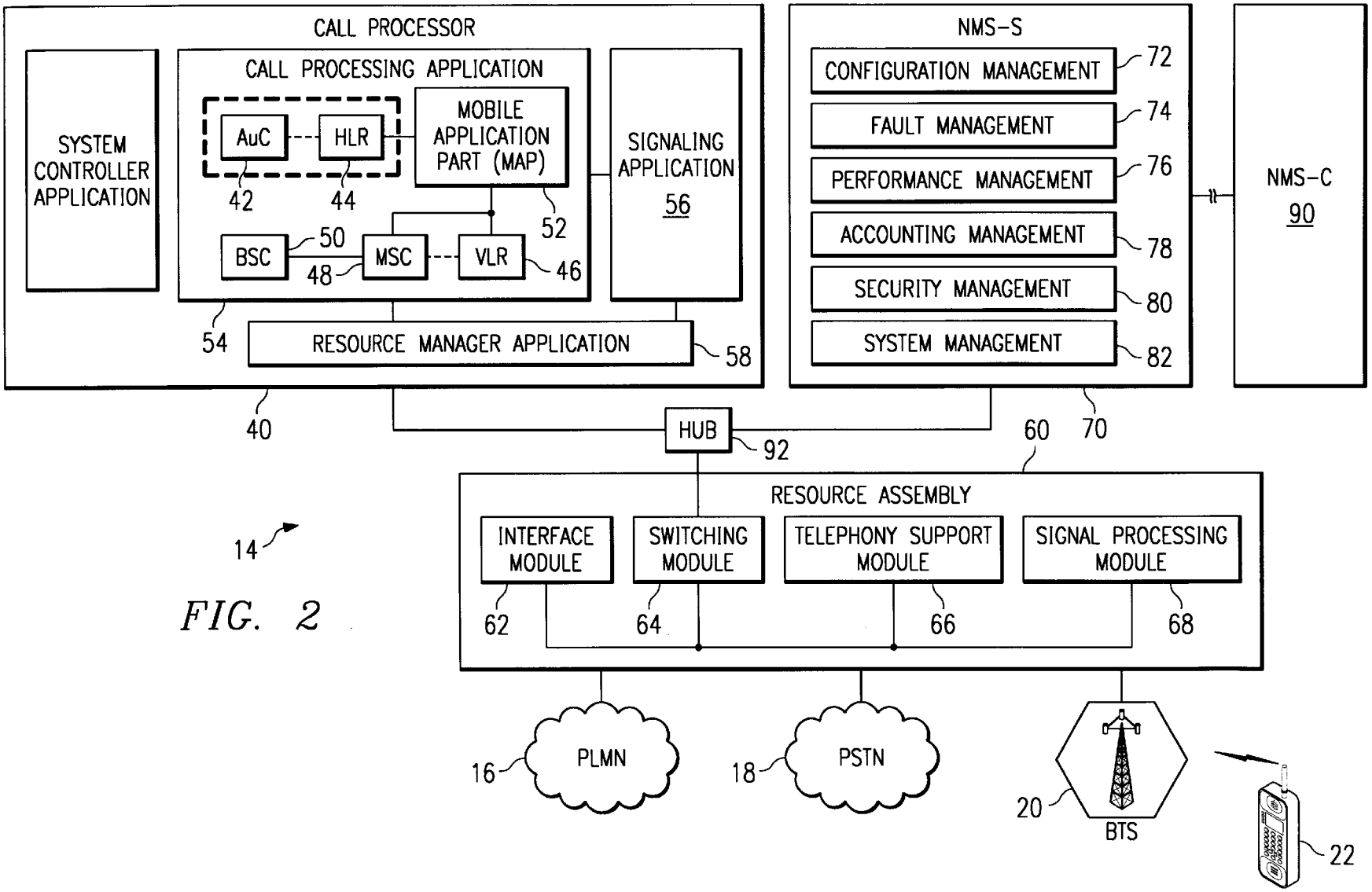
FIG. 2 is a block diagram illustrating functional blocks of the exemplary integrated wireless telecommunications system in more detail.

FIG. 2 is block diagram illustrating functional blocks of the exemplary integrated wireless telecommunications system 14 in more detail. The exemplary integrated wireless telecommunications system 14 is designed to be compatible with the GSM specifications and includes the call processor 40, the NMS-S 70, the NMS-C 90, a hub 92 and the resource assembly 60. The PLMN 16, the PSTN 18, and the one or more BTSs 20, including the one or more subscriber units 22, are provided in communication with the resource assembly 60. The call processor 40, in one embodiment, includes a call processing application 54, a signaling application 56, a system controller application 94 and a resource manager application 58. Each of these applications preferably include at least one computer software object. It should be mentioned that these various computer software objects may be developed using virtually any computer programming language but will preferably be developed using a computer programming language designed for object-oriented programming such as C++, Virtual C++, JAVA and the like.

The system controller application 94 is responsible for ensuring that the call processor 40 is operating properly by periodically testing the other applications of the call processor 40. A successful test of an application of the call processor 40 may comprise, for example, observing a predetermined response from the application after sending a predetermined message to the application. This may be referred to as "pinging."

The signaling application 56 provides the logic needed to provide signaling functionality to the integrated wireless telecommunications switch 14. The signaling functionality is preferably provided as SS7 signaling to provide SS7 connectivity to the PLMN 16 and the PSTN 18. The signaling application 56 is responsible for performing various functions and providing user interfaces associated with the various parts and protocols that are included within SS7 signals. SS7 signals provide a transport mechanism for exchanging MAP messages and out-of-band signaling information with other switches. SS7 signals include several parts, each having a distinct protocol. Specifically, SS7 signals include: (a) a lower layer Message Transfer Part (MTP), which apply to basic routing of signaling messages between signaling points, (b) a Signaling Connection Control Part (SCCP) and a Transaction Capabilities Application Part (TCAP), which apply to additional routing and management functions for the transfer of messages and for database queries and (c) Telephone User Part (TUP) and Integrated Services User Part (ISUP), which apply generally to setting up, coordinating and taking down trunk calls. The signaling application 56 is in communication with the resource manager application 58 and a Mobile Application Part Object (MAP) 52 and the MSC 48 of the call processing application 54.

The resource manager application 58 serves as the "bridge" or "conduit" between the call processor 40 and the resource assembly 60. The resource manager application 58 manages and allocates the resources of the resource assembly 60 with respect to the call processor 40 and enables different applications of the call processor 40 to interface with resources of the resource assembly 60. Preferably, the resource manager application 58 also provides an interface to resources of the resource assembly 60 for the signaling application 56 as well as other elements, such as the system controller application 94 and various elements of the NMS-S 70.

The resource manager application 58 is preferably implemented in software using object-oriented programming, and achieves the management and allocation of resources by employing ORB technology, such as CORBA. In accordance with an exemplary embodiment, the resource manager application 58 provides a proxy object for each object or application outside the resource manager application 58 which may seek to interface with the resource manager application 58. Similarly, each such object or application is provided with a counterpart proxy object. An interface is defined between each proxy object of the resource manager application 58 and the object or application to which it corresponds, as well as between each counterpart proxy object and the resource manager application 58. An interface can be defined (such as by using Interface Definition Language or IDL) to establish acceptable messages and responses that can be exchanged over the defined interface. When a particular object or application desires to interface with a resource of the resource assembly 60, a message is sent from that object or application to the counterpart proxy object of that element or application. That counterpart proxy object then, in turn, forwards the request to the resource manager application 58 in conformance with the defined interface. Similarly, when the resource manager application 58 desires to interface with a particular object or application (for example, the call processing application 46) with respect to a resource of the resource assembly 60, a message is sent to the proxy object of the resource manager application 58 corresponding to the particular object or application. That proxy object then, in turn, forwards the request to the particular object or application in conformance with the defined interface.

The call processing application 54 includes various software objects, all of which have been previously introduced and described in relation to FIG. 1 with the exception of the MAP 52. Once again the BSC 50 is responsible for management of the BTSs 20 and their radio interfaces with subscriber units 22, including the allocation and release of radio channels associated with a given radio interface and management of handovers from one BTS 20 to another BTS 20. The BSC 50 manages the one or more BTSs 20 and their radio interfaces through the allocation, release and handover of radio transmission channels. The BSC 50 may carry out various procedures that relate to call connection tasks. For example, the BSC 50 may be responsible for system information broadcasting, subscriber paging, immediate traffic channel assignment, subsequent traffic channel assignment, call handover, radio connection and release, connection failure detection and reporting, and power capability indication reporting. The BSC 50 may also be responsible for management of both the Abis link and the A interface. In an exemplary embodiment, the BSC 50 controls a TRAU provided in a signal processing module 68 of the resource assembly 60 through the resource manager application 58.

The MSC 48 and the VLR 46 may be integrated together or separately, as indicated by the dashed line in FIG. 2. The MSC 48 controls the switching of calls, collects the details of calls made, and supervises the operation of the remainder of the switch. The MSC 48 is primarily responsible for mobility management, call control and trunking, such as coordinating the setting-up and termination of calls to and from the subscriber units 22. Additionally, MSC 48 provides all of the functionality needed to handle the mobility of the one or more subscriber units 22 through location updating, handover and call delivery.

The MSC 48 is in contact with the subscriber units 22 through the A type interface with the BSC 50, the resource manager application 58 and the resource assembly 60. The A interface provides the link for managing terrestrial trunks, and also provides the MSC 48 with transport of messages to the subscriber units 22. The Base Station Subsystem Management Application Part (BSSMAP) protocol may be employed to transmit connection-related messages and paging messages between the MSC 48 and BSC 50. The MSC 48 controls a switching matrix of a switching module 64 of the resource assembly 60. For example, the MSC 48 is operable to process a service request from the subscriber unit 22, and route a corresponding call to a designated destination such as the PLMN 16, the PSTN 18 or to another one of the subscriber units 22. Similarly, the MSC 48 is operable to process a service request from a remote subscriber through, for example, the PLMN 16, or the PSTN 18 and route a corresponding call to a designated one of the subscriber units 22.

The VLR 46, the HLR 44 and the AuC 42 function as previously described in detail with respect to FIG. 1 except that the MAP 52 is expressly provided to allow the VLR 46 and the HLR 48 to exchange MAP messages. Once again, the dashed line between the HLR 44 and the AuC 42 is provided to signify that the HLR 44 and the AuC 42, although preferably integrated as one software object with the AuC 42 embedded within the HLR 44, may also be implemented as separate software objects that are integrated into the same application process or executable file. The application process or executable file is provided in FIG. 2 as the call processing application 54. The VLR 46 provides a database containing information on all active subscriber units of the exemplary integrated wireless telecommunications system 14, including roaming subscriber units. Whenever an active subscriber unit such as the subscriber unit 22 requests service, an authentication must be performed. The authentication will include the subscriber units home AuC, which, in this case, is the AuC 42.

The MAP 52 works with the signaling application 56 when it receives a request from the VLR 46 to send a MAP message, such as a request to perform an authentication, to the HLR 44. The MAP 52 is the logical link between the VLR 46 and the HLR 44 and provides the dialogues through which they communicate with each other and with other elements and objects. The MAP 52 provides a protocol based on the services provided by the signaling application 56 for non-call related signaling (specifically, TCAP) for use by other elements and objects. The specific nature of the protocol provided by the MAP 52 is dependent on the identity of such elements, which is sometimes referred to as the MAP protocol interface. For example, messages between the VLR 46 and an external HLR utilize one MAP protocol interface while messages between the VLR 46 and an external VLR utilize another MAP protocol interface. Authentication sets or triplets may be provided from the HLR 44 to the VLR 46 using the MAP 52.

The NMS-S 70, in an exemplary embodiment, includes several elements for configuring and managing elements of the call processor 40 and the various resources of the resource assembly 60. Specifically, the NMS-S 70 includes a configuration management element 72, a fault management element 74, a performance management element 76, an accounting management element 78, a security management element 80, and a system management element 82. These elements provide operations, administration, maintenance and provisioning related services, and preferably include one or more logical servers or software objects. These elements of the NMS-S 70 may be implemented as software objects using object-oriented technology. These elements or objects may be accessed using the NMS-C 90, which serves as a client to the NMS-S 70.

The configuration management element 72 includes one or more objects to provide services necessary to administer the configurable attributes of the main functional elements associated with the call processing application 54, the resource manager application 58 and the signaling application 56. For example, the configuration management element 72 may be used to modify subscriber databases of the call processing application 54, as well as to configure of specific elements or objects of the call processing application 54, such as the BSC 50 and the MSC 48. In one embodiment, the NMS-C 90 provides a configuration Graphical User Interface (GUI) that identifies the various applications and or objects of the call processor 40 to allow an operator to configure the corresponding functional components of the call processing application 54, the resource manager application 58 and the signaling application 56 using the objects or servers of the NMS-S 70. The fault management element 74 provides for the detection, logging and reporting of alarms, errors, and selected events from the call processor application 54 and the resource assembly 60. The performance management element 74 provides for the periodic collection and analysis of system performance and traffic information from the resource assembly 60 and the call processing application 54.

The accounting management element 78 attends to the creation and storage of billing records for calls originated or terminated to the subscriber unit 22, as well as calls forwarded to or from the subscriber unit 22. Such billing records are in the form of a call data record and may be presented or generated as desired. The security management element 80 provides for discriminatory access to operation, administration and maintenance operations based on the given operator of the NMS-S 70, which is provided through the NMS-C 90. Various security levels are defined that determine the operations that are available to a given operator. In one embodiment in which the NMS-S 70 utilizes MICROSOFT WINDOWS NT SERVER as its operating system and the NMS-C 90 utilizes MICROSOFT WINDOWS NT CLIENT as its operating system, the security functions provided by these operating systems may be used to implement the functions of the security management element 80. Finally, the system management element 82 supports the start-up and recovery functions of the integrated wireless telecommunications system 14. The system management element 82 is operable to initiate tests to assess the operation of various elements, objects and resources, and to cause the reset of such elements and resources in the event of incorrect operation.

The resource assembly 60 provides the physical connections with the one or more BTSs 20, the PLMN 16 and the PSTN 18 so that voice, data and signaling information may be exchanged and is controlled and monitored by the call processor 54 and the NMS-S 70. The resource assembly 60 may include any number of redundant circuit modules, control busses and high speed busses. For example, in addition to the switching module 64 and the signal processing module 68, which have already been introduced, the resource assembly 60 includes an interface module 62 and a telephony support module 66. In an exemplary embodiment, the signal processing module 68, the interface module 62 and the telephony support module 66 interface through one or more of the switching modules 64. Control information is provided to these modules by the switching module 64 over a control bus, while data or information is provided to these modules by the switching module 64 over a high speed bus.

The switching module 64 may be implemented in software, hardware or a suitable combination of software and hardware. The switching module 64 preferably performs switching operations, clock operations, and local communications between resources of the resource assembly 60 of the integrated wireless telecommunications system 14. These operations may be performed using pulse code modulation switching and data transfer techniques, Link Access Protocol on the D Channel (LAP-D) communications and Ethernet interface communications.

A switch preferably resides within the switching module 64 to perform the switching functions and operations. The switch may be a timeslot switch having a memory timeslot matrix to make required timeslot cross-connections within the integrated wireless telecommunications system 14. The switch functions to set up and tear down both simplex and duplex connections between two specified channels, which may represent a call or other useful connections. For example, the switch may cause a channel (provided by, for example, the BTS 20 or the PSTN 18) to connect to a call progress tone or a voice announcement. Further, the switch may also set up system defined connections upon power up and reset as well as connections for the testing of timeslots when not in use. Timeslots are preferably provided to the timeslot switch via the high speed bus.

The switching module 64 may also, for example, include suitable digital data processing devices, a processor, random access memory and other devices. Preferably, each switching module 64 runs a suitable operating system, and includes one or more pulse code modulation bus interfaces, one or more High Level Data Link Controller (HDLC) control bus interfaces, one or more Ethernet interfaces, and an arbitration bus interface to other switching modules 64.

The telephony support module 66 may be implemented in software, hardware or a suitable combination of software and hardware. The telephony support module 66 may, for example, provide tone generation, digit transceiver functions, and digitized announcements. The telephony support module 66 may also provide call setup functions, such as digit collection and out-pulsing, and call completion functions, such as digitized announcement generation and call supervisory tone generation. The telephony support module 66 may, for example, include suitable telecommunications data processing equipment, such as a processor, random access memory, one or more redundant High Level Data Link Controller bus interfaces, one or more pulse code modulation buses, and an arbitration bus for establishing an active telephony support module 66 status. Preferably, a single telephony support module 66 provides all required telephony support functionality for the integrated wireless telecommunications system 14, and the one or more additional telephony support modules 66 are used to provide redundancy in the event of component or module failure.

The interface module 62 is an interface device that is used to interface a suitable number of telecommunications lines that carry data in a predetermined format, such as an E1 data format, with the integrated wireless telecommunications system 14. The one or more interface modules 62 provide the physical interface with other equipment, the PSTN 18, the PLMN 16 and the one or more BTSs 20. The interface module 62 also supports in-band trunk signaling for DSO data channels that are configured for channel associated signaling, and transmit data to and receive data from the signal processing module 68. The interface module 62 may be implemented in software, hardware or a suitable combination of software and hardware. For example, the interface module 62 may include suitable data processing equipment, such as a processor, random access memory, four E1 ports, redundant High Level Data Link Controller bus interfaces, and pulse code modulation bus interfaces.

The signal processing module 68 is preferably used to provide an interface between the call processor 40 and the signaling system. For example, signaling data may be received from a data transmission channel from the PSTN 18, and may be switched to another data transmission channel, such as an E1 telecommunications channel, from an interface module 62 to a signal processing module 68 by a switching module 64. A signal processing module 68 is also preferably employed to perform transcoding and rate adaption functions, such as converting from a wireless system speech encoding format to a pulse code modulation data format as well as other functions, such as echo cancellation functions. For example, signal processing module 68 may be employed by the integrated wireless telecommunications system 14 to convert data from the GSM data format to another format, such as the pulse code modulation data format.

One or more digital signal processors (DSPs) are preferably provided within the signal processing module 68. A multi-channel TRAU is preferably implemented in a DSP. That is, one or more DSPs preferably incorporate functions associated with the TRAU. Such DSPs preferably include multiple input and output buffers for storing multiple channel audio data, and perform rate adaption through an interrupt-driven routine that places the appropriate channel data onto both the near-end and far-end transmission lines at the appropriate data rate. With the implementation of rate adaption, such DSPs also have further processing power available to perform encoding and decoding of the incoming audio data. In addition to functions associated with the TRAU, an echo-cancellation capability may be advantageously provided by the DSPs by utilizing the already robust voice activity detection bits produced in transcoding a signal.

An E1 or T1 transmission line providing a 16,000 bits per second signal, which may carry four traffic channels, may be coupled to an interface module 62. That signal may, in turn, be connected to a DSP of the switching module 64 over the high speed bus. A DSP is further connected to a 64,000 bits per second transmission line also capable of carrying, for example, four traffic channels. The 64,000 bits per second transmission line can be, for example, a 64,000 bits per second PCM line. These lines are functionally bi-directional; each transmission line is connected to both an input and output of the DSP. The DSP may be further connected via an address bus, a data bus, and a control bus to at least one random access memory and at least one read only memory device, in a conventional manner. The DSP used in this exemplary embodiment can be, for example, an Analog Devices 2106x digital signal processor chip.

The signal processing module 68 may be implemented in software, hardware or a suitable combination of software and hardware. In addition to one or more DSPs, the signal processing module 68 may include suitable data processing equipment, such as a processor, random access memory, four daughter board module ports, redundant High Level Data Link Controller bus interfaces, pulse code modulation matrix bus interfaces and other signal processing application hardware.

In operation, a subscriber unit 22 may attempt to place a call using the exemplary wireless telecommunications system 14 by the following procedures. Signaling data and other call control data is received from the BTS 20 in an E1 data format at the interface module 62. That data is then switched through the switching module 64 to the telephony support module 66, which performs call setup functions. The call processor 40 receives the signaling data, and determines the call destination. Depending upon the call destination, the call processor 40 sends signaling and call control data to the PSTN 18, another telecommunications system, or a BTS 20 serviced by the integrated wireless telecommunications system 14. If a telecommunications channel cannot be established, a busy signal, a no answer message, or another appropriate response is generated by the telephony support module 66, and the call attempt is terminated. If a telecommunications channel can be established, the call processor 40 configures the switching module 64, the telephony support module 66, the interface module 62, and the signal processing module 68 to process the call data. A similar process is also used to handle incoming telecommunications channels from, for example, PSTN 18 or other telecommunications switches, or to de-allocate elements of the integrated wireless telecommunications system 14 after a call is completed.

The call processor 54, the resource assembly 60 and the NMS-S 70 may communicate with one another through the hub 92. Preferably, the hub 92 is provided as an Ethernet hub so that information may be exchanged between the various elements and objects as needed. The NMS-S 70 and the NMS-C 90 preferably communicate with one another through a hub, not expressly shown in FIG. 2, such as an Ethernet hub, using CORBA. However, the NMS-C 90 may be located locally or remotely with respect to the NMS-S 70. When located remotely, a modem or other communication device may be employed to allow communication between the NMS-S 70 and the NMS-C 90. It should also be noted that more than one NMS-C 90 may access and communicate with the NMS-S 70, and, in other embodiments, the NMS-C 90 may access and communicate with more than one NMS-S 70.

Once again, while the exemplary integrated wireless telecommunications system 14 of FIG. 2 was designed as a GSM system, it should be appreciated and understood that the present invention should not be construed to be so limited. Rather, the present invention is equally applicable to use with technologies and applications other than GSM, including, among others, PCS, CDMA and TDMA technologies.

Figure 3:
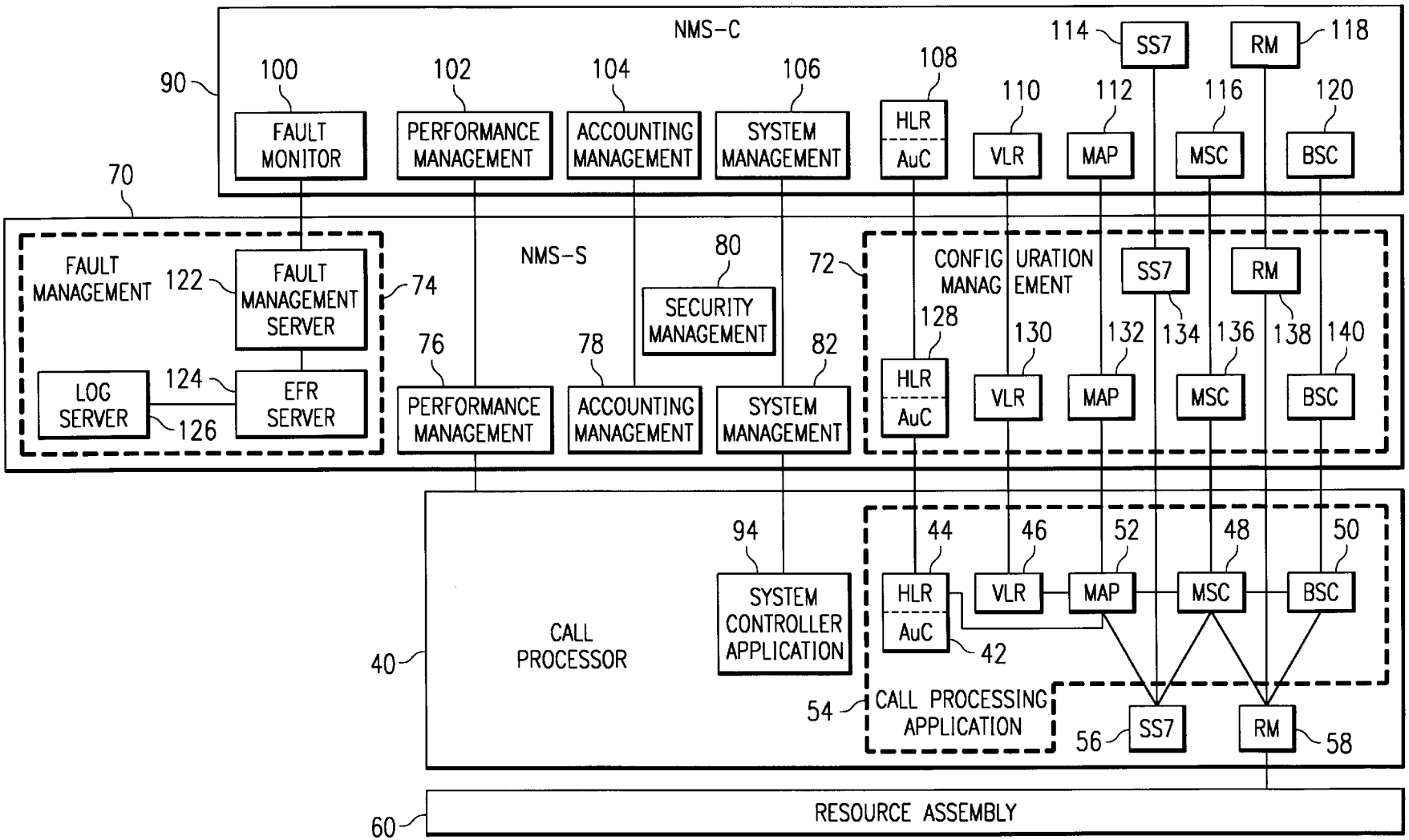
FIG. 3 is a block diagram illustrating exemplary software application processes, that include one or more software objects, of the integrated wireless telecommunications system.

FIG. 3 is a block diagram illustrating exemplary software application processes, that include one or more software objects, of the integrated wireless telecommunications system 14 according to the teachings of the present invention. More specifically, FIG. 3 illustrates various software objects of the NMS-C 90, the NMS-S 70, and the call processor 40. The connection between the call processor 40 and the resource assembly 60 is also illustrated.

As discussed above in connection with FIG. 2, the resource assembly 60 preferably includes a switching module 64, a telephony support module 66, a signal processing module 68 and an interface module 62. Each of these modules preferably include software and communicate with the resource manager application 58 of the call processor 40. These modules preferably include specific resources that can be employed and controlled by the call processor 40. Alternatively, specific resources may be distributed amongst the various modules of the resource assembly 60. It should therefore be recognized and appreciated that the allocation of resources within the resource assembly 60 is not pertinent to the scope of the present invention.

The software architecture of the exemplary integrated wireless telecommunications system 14 is preferably based on object oriented software engineering technology, and the use of managed objects provided within the NMS-C 90 and the NMS-S 70 as illustrated in FIG. 3. Software objects are used to model and support the various functional, hardware, and interface components and sub-components associated with the integrated wireless telecommunications system 14. Such software may also model the functional procedures performed by physical components. Managed objects such as, for example, subscribers and trunk groups may be created, modified and deleted by an operator.

The NMS-S 70 includes a variety of software objects that may be logically grouped by function. Generally, the NMS-C 90 provides corresponding software objects that may provide a GUI interface to an operator. The corresponding software objects of the NMS-C 90 allow an operator to retrieve and display information from the corresponding objects of the NMS-S 70 and, in some cases, allow an operator to control these corresponding objects. The various software objects of the NMS-S 70 may be grouped into the functional areas of configuration management, fault management, performance management, accounting management, security management and system management. All of these functional areas correspond to a software object of the NMS-C 90 except for the security management element 80 which, preferably, will have very restricted access. The security management element 80 is preferably responsible for validating operator log-in information and restricting access to certain operations based on the operator's access class. This functionality may be provided by the operating system software of the NMS-S 70.

The functional areas of the NMS-S 70, as previously discussed in connection with FIG. 2, may be referred to as elements, while the corresponding software objects of the NMS-C 90 may be referred to as objects. The following elements have corresponding software objects of the NMS-C 90: the configuration management element 72, the fault management element 74, the performance management element 76, accounting management element 78 and the system management element 82. The configuration management element 72 includes an HLR/AuC object 128, a VLR object 130, a MAP object 132, a signaling object 134 (such as an SS7 object), an MSC object 136, a resource manager object 138 and a BSC object 140. The corresponding software objects of the NMS-C 90 include an HLR/AuC object 108, a VLR object 110, a MAP object 112, a signaling object 114 (such as an SS7 object) , an MSC object 116, a resource manager object 118 and a BSC object 120. As mentioned previously, all of the objects of the NMS-C 90 generally provide GUI interfaces for an operator to monitor and configure the corresponding object in the NMS-S 70, such as maintaining subscriber data. Each of the objects of the NMS-S 70 corresponds with the associated application or object provided in the call processing application 54, the signaling application 56 and the resource manager application 58 as illustrated. The function of all of these applications and objects of the call processor 40 is provided above in connection with FIGS. 1 and 2.

With respect to the configuration management element 72, an operator can make changes to reflect the addition or removal of hardware components or modifications to their operational parameters, changes to reflect the addition or removal of subscribers and to subscriber service profiles, and modify translation tables of the MSC 48. Changes made by an operator are sent to the corresponding object of the NMS-S 70 which, in turn, updates a local data base, notifies all peer elements of the call processing application 54 of those changes, and reports the completion status of the change request to the operator.

The system management element 82, in the exemplary embodiment of FIG. 3, is provided as its own object that corresponds with the system management object 106 of the NMS-C 90 and the system controller application 94 of the call processor 40. This allows an operator to access and display information generated by the system controller application 94. The system management element 82 also supports the start-up and recovery functions of the entire system. Preferably, it is responsible for the sequential, automatic start-up of other objects of the NMS-S 70 by reading system start-up files and periodically polling such elements to verify their operational status and automatically restarting failed elements. The system management element 82 periodically requests that functional elements and objects of the integrated wireless telecommunications system 14 update their stored configuration files to support system recovery. This ensures the availability of start-up files that will allow the system processors to restart at a known configuration state following a shutdown or reset. The system management object 106 of the NMS-C 90 provides an operator with a list of elements or objects residing in the integrated wireless telecommunications system 14, and the status of such elements or objects. The operator is also provided with the ability to start, stop or query the status of individual elements or objects.

The accounting management element 78 and a corresponding accounting management object 104 provide billing records, in the form of call data records, that are reported from the accounting management element 78 to an EFR server object 124, which, in turn, stores the records on a database associated with the NMS-S 70. The performance management element 76 polls the call processing application 54 for function-specific performance measurements, and generates reports based on those measurements. The reports are sent and stored by the EFR server object 124. A corresponding performance management object 102 provides an interface for the operator for these functions of the performance management element 76.

The fault management element 74 concerns alarms and fault-related events. These are routed from the EFR server object 124 to the NMS-C 90 for display and to a log server object 126 for storage and later processing. The NMS-C 90 provides a filtering and reporting mechanism through a fault monitor object 100 that allows an operator to tailor alarm, event, and state change reporting to meet specific needs. The fault monitor object 100 may include a browser interface that allows one or more operators to access current alarm, event, alarm and state change information. The fault monitor object 100 interfaces with the fault management server object 122 of the NMS-S 70 and provides a consistent view of network alarm conditions. Real-time notifications are forwarded to the fault monitor object 100 from the EFR server object 124. An operator has the ability to filter these notifications (messages) based on their type and severity level.

The EFR server object 124 provides common services that support various elements and objects of the NMS-C 90. The EFR server object 124 receives real-time event notifications, such as alarms, test results and billing records, generated by the call processor 40, the resource assembly 60 and other elements of the NMS-S 70. The EFR server object 124 is operable to filter them, and then route them to desired destinations within the integrated wireless telecommunications system 14.

The log server object 126 is responsible for logging functions. As such, it receives various alarm, event, and state change notifications from the EFR server object 124 and stores the information to a database that may be accessed by the NMS-C 90.

FIG. 4 is a block diagram illustrating an exemplary HLR 44 and AuC 42 of the integrated wireless telecommunications system 14. The HLR 44 and the AuC 42, although preferably integrated as one software object with the AuC 42 embedded within the HLR 44, may also be implemented as separate software objects that are integrated into the same application process or executable file such as the call processing application 54.

The HLR 44 includes a subscriber database 160 and a plurality of procedures such as a first procedure 162 and an Nth procedure 164. As previously mentioned, the subscriber database 160 includes any of a variety of subscriber information. For example, the subscriber information may include IMSIs, services and features, and Kis. The plurality of procedures, such as the first procedure 162 and the Nth procedure 164, will include a procedure to initiate the generation of an authentication set or authentication triplets in the AuC 42.

The AuC 42 is preferably embedded within the HLR 44 and may include its own procedures, such as a procedure 174, or use the procedures of HLR 44 which would receive the request from the procedure of the HLR 44 to generate the authentication set in the AuC 42. This request to execute, for example, the procedure 174, may be provided in the form of a message that identifies the software object, i.e., AuC 42, the procedure 174 and parameters such as the subscriber's Ki. Although the HLR 44 and the AuC 42 of FIG. 4 are illustrated as objects that communicate using procedure calls, the present invention is not so limited. The present invention includes virtually any type of inter-object or intra-object communication mechanism.

In response to receiving the request from the HLR 44, the AuC 42 begins a process of generating the authentication set or the authentication triplets. The AuC 42 includes a random number generator 168, an A-3 algorithm 170 and an A-8 algorithm 172. The random number generator 168 may be implemented as a stand-alone procedure or as part of another procedure of either AuC 42 or HLR 44. The random number generator 168 generates a RAND that is used as an input to both the A-3 algorithm and the A-8 algorithm. The subscriber's Ki also serves as an input to both the A-3 algorithm 170 and the A-8 algorithm 172. The A-3 algorithm 170 generates a network generated SRES, while the A-8 algorithm generates a network generated Kc. The authentication set or the authentication triplet, which includes the RAND, and the network generated SRES and Kc, may be provided to VLR 46, not shown in FIG. 4, so that the authentication procedure may proceed. In this manner, a subscriber unit may be authenticated without ever having to transmit, and hence potentially compromise, the value of Ki.

In alternative embodiments, the AuC 42 may include a Ki database that provides the Ki for various subscribers. In this case, the HLR 44 sends the subscriber's id, such as the subscriber's IMSI, so that the subscriber's Ki can be retrieved from the Ki database. However, it is advantageous to include the Ki information as part of the subscriber database 160 of the HLR 44 because of reduced software complexity and because of advantages gained by storing all subscriber information in one database. Preferably, the Ki information, either at the AuC 42 or the HLR 44, is encrypted as stored and thus would have to be decrypted before being used as an input to the A-3 and the A-8 algorithms.

In still another alternative embodiment, multiple algorithms, such as multiple versions of the A-3 algorithm and multiple versions of the A-8 algorithm, may be provided at the AuC 42. In such a case, subscriber information is provided from the subscriber database 160 to the AuC 42 that indicates which version of each algorithm is used by each subscriber unit 22 so that the correct versions would be used to correspond with the versions used in the subscriber unit 22.

FIG. 5 is a flow chart illustrating an exemplary method for authentication using the AuC 42 of the call processing application 54, which may also be referred to as an application process, of the integrated wireless telecommunications system 14. The method begins at step 180 and proceeds to step 182 where a subscriber unit requests service from a wireless telecommunications network. The wireless telecommunications network receives the request for service, and, at step 184, the wireless telecommunications network requests approval from the home HLR of the requesting subscriber unit. The VLR of the wireless telecommunications system that the subscriber unit is presently using will, generally, request information from the home HLR of the subscriber unit. At step 186, the home HLR requests generation of an authentication set from the home AuC. For example, assuming the home HLR is the HLR 44 of the integrated wireless telecommunications system 14, the HLR 44 initiates the generation of an authentication set using the AuC 42.

In one embodiment, the AuC 42 and the HLR 44 are implemented as one software object including one or more procedures or methods. In such a case, the authentication set is generated by initiating one of the procedures of the combined HLR\AuC. In another embodiment, the AuC 42 and the HLR 44 are implemented as two separate software objects included as part of the call processing application 54. In such as case, the HLR 44 sends a message to the AuC 42, including the IMSI of the requesting subscriber unit, so that a procedure is executed at the AuC 42 to generate the authentication set. This may be generated as discussed above and as illustrated in FIG. 4.

At step 188, the authentication set is generated by the AuC 42 and, at step 190, a subset of the authentication set is communicated to the subscriber unit. The subset, in an exemplary embodiment, will include the value RAND. At step 192, the subscriber unit, using its SIM, will generate a corresponding subscriber generated SRES and Kc. This will preferably be accomplished locally at the subscriber unit using a stored Ki and the received RAND as inputs to the A-3 algorithm and the A-8 algorithm. Of course, the Ki is preferably inaccessible to the user and may be encrypted. After generating the subscriber authentication information, including preferably the subscriber generated SRES, information is ready to be sent back to the system that sent the subset of the authentication set, normally the VLR of the wireless telecommunications network from which service was requested.

At step 194 subscriber authentication information, normally the subscriber generated SRES, is communicated back to the wireless telecommunications system. At step 196, the subscriber information provided back to the wireless telecommunications system is compared to the authentication set previously generated by the AuC 42. In an exemplary embodiment, this involves comparing the subscriber generated SRES to the network generated SRES at the VLR. If these values are equivalent, the subscriber unit is authenticated. Otherwise, the subscriber unit is not provided access to the wireless telecommunications system. The method ends at step 198.

Thus, it is apparent that there has been provided, in accordance with the present invention, an integrated authentication center and method for authentication in a wireless telecommunications network that satisfies the advantages set forth above. Although the present invention has been described in detail, it should be understood that various changes, substitutions and alterations can be made herein without departing from the scope of the present invention. For example, the functionality of the various components of a wireless telecommunications network illustrated herein may be distributed, arranged, combined or integrated in virtually any manner, depending on the particular type of network and implementation. As another example, the direct connections or communications illustrated herein could be altered by one skilled in the art such that two components or subsystems are merely coupled to one another through an intermediate component or components without being directly connected while still achieving the desired results demonstrated by the present invention. For example, the modules of the resource assembly 60 may be provided in an number of arrangements and functionalities without departing from the present invention. Similarly, the number and type of algorithms used in the authentication process may be varied and changed without departing from the scope of the present invention. Furthermore, although the present invention has been primarily illustrated and described with respect to a GSM wireless telecommunications network, it should be understood that the present invention is not limited to a GSM wireless telecommunications network. In fact, the present invention could be used with virtually any wireless telecommunications network, whether currently in existence or developed in the future, operating at virtually any frequency and using virtually any technology. Other examples of changes, substitutions, and alterations are readily ascertainable by one skilled in the art and could be made without departing from the spirit and scope of the present invention as defined by the following claims.

What is claimed is:

1. An integrated authentication center for use in a wireless telecommunications network comprising:

an application process comprised of a plurality of software objects;

a home location register implemented in one or more of the plurality of software objects of the application process and operable to initiate the generation of an authentication set; and an authentication center implemented in one or more of the plurality of software objects of the application process and operable to generate the authentication set in response to the home location register.

2. The integrated authentication center of claim 1, wherein the home location register and the authentication center are implemented in the same one of the plurality of software objects of the application process.

3. The integrated authentication center of claim 2, wherein the home location register initiates the generation of the authentication set by invoking a procedure in the authentication center.

4. The integrated authentication center of claim 1, wherein the authentication set includes a random number and a network signed response.

5. The integrated authentication center of claim 1, wherein the authentication center stores a unique Ki for each associated subscriber.

6. The integrated authentication center of claim 5, wherein the authentication center generates a random number and uses the random number and the Ki as inputs to an A-3 algorithm to generate a signed response.

7. The integrated authentication center of claim 5, wherein the authentication center generates a random number and uses the random number and the Ki as inputs to an A-8 algorithm to generate a Kc.

8. The integrated authentication center of claim 1, wherein the home location register software object initiates the generation of the authentication set by invoking a procedure in the authentication center software object.

9. The integrated authentication center of claim 1, wherein the home location register is further operable to store Mobile Subscriber Integrated Services Digital Network information and International Mobile Subscriber Identity information.

10. The integrated authentication center of claim 1, wherein the application process is implemented as part of a call processor of a wireless telecommunications switch.

11. The integrated authentication center of claim 1, wherein the integrated authentication center is implemented as part of a Global System for Mobile Communications network.

12. The integrated authentication center of claim 1, wherein the integrated authentication center is implemented as part of a wireless telecommunications network that includes Code Division Multiple Access technology.

13. The integrated authentication center of claim 1, wherein the integrated authentication center is implemented as part of a wireless telecommunications network that includes Time Division Multiple Access technology.

14. A wireless telecommunications switch having an integrated authentication center, the wireless telecommunications switch comprising:

an application process comprised of a plurality of software objects;

a mobile switching center implemented in one of the plurality of software objects of the application process and operable to control the switching of calls;

a base station controller implemented in one of the plurality of software objects of the application process and operable to manage the radio resources for one or more base station transceivers;

a home location register implemented in one of the plurality of software objects of the application process and operable to initiate the generation of an authentication set; and an authentication center implemented in one of the plurality of software objects of the application process and operable to generate the authentication set in response to the home location register.

15. The wireless telecommunications switch of claim 14, further comprising:

a visitor location register implemented in one of the plurality of software objects of the application process and operable to store information on local subscriber units.

16. The wireless telecommunications switch of claim 15, wherein the mobile switching center and the visitor location register are implemented in the same software object of the application process.

17. A method for authentication in a wireless telecommunications network comprising the steps of:

receiving a request from a subscriber for service;

requesting approval from a home location register to provide service to the subscriber;

initiating the generation of an authentication set by an authentication center using a procedure, wherein the home location register and the authentication center are integrated in one or more software objects of an application process;

generating the authentication set; and communicating a subset of the authentication set to the subscriber.

18. The method of claim 17, further comprising the steps of:

generating subscriber authentication information at the subscriber in response to the communicating a subset of the authentication set step;

communicating the subscriber authentication information to the wireless telecommunications network; and comparing the subscriber authentication information to information provided in the authentication set.

19. The method of claim 18, wherein the authentication set includes a random number and a network signed response, and the subset of the authentication set includes the random number.

20. The method of claim 19, wherein the generating subscriber authentication information step includes using the random number as an input to an A-3 algorithm to generate a subscriber signed response as an output.

21. The method of claim 20, wherein the comparing the subscriber authentication information step includes determining if the subscriber signed response is equivalent to the network signed response.

22. The method of claim 18, wherein the authentication set includes a random number, a network generated signed response and a network generated Kc, and the subset of the authentication set includes the random number.

23. The method of claim 22, wherein the authentication center and the subscriber store a Ki value, and wherein the generating the authentication step and the generating subscriber authentication information step includes using the random number and the Ki value as inputs to an A-3 algorithm to generate the network generated signed response and a subscriber generated signed response as an output, and using the random number and the Ki value as inputs to an A-8 algorithm to generate the network generated Kc and a subscriber generated Kc as an output.

24. The method of claim 23, wherein the comparing the subscriber authentication information step includes determining if the subscriber signed response is equivalent to the network signed response.

25. The method of claim 17, wherein the generating the authentication set step includes generating a random number, a network generated signed response and a network generated Kc.

26. The method of claim 17, wherein the authentication center and the subscriber store a Ki value.

27. The method of claim 17, wherein the wireless telecommunications network is a Global System for Mobile Communications network.

28. The method of claim 17, wherein the authentication set includes a signed response and a random number generated by the authentication center.

29. The method of claim 17, wherein the initiating the generation of an authentication set step includes using the home location register software object to invoke the procedure provided in the authentication center software object to generate the authentication set.

30. The method of claim 17, wherein the authentication center software object is embedded in the same software object as the home location register.

31. The method of claim 17, wherein the initiating the generation of an authentication set step includes sending the subscriber's Ki to the authentication center.

32. The method of claim 17, wherein the initiating the generation of an authentication set step includes sending an algorithm version number to the authentication center.

33. The method of claim 17, wherein the authentication center is operable to store multiple algorithm versions.

34. The method of claim 17, wherein the authentication center and the home location register communicate using inter-object communications.

35. The method of claim 17, wherein the authentication center and the home location register communicate using intra-object communications.

36. The method of claim 17, wherein the authentication center and the home location register are implemented as software objects and the authentication center is embedded in the home location center object.

37. The method of claim 17, wherein a unique Ki for each associated subscriber is stored in a database of the home location register.

* * * * *